(12) United States Patent
Zhang et al.

(10) Patent No.: US 9,706,548 B2
(45) Date of Patent: Jul. 11, 2017

(54) JOINT TRANSMIT AND RECEIVE PROCEDURE

(71) Applicant: Telefonaktiebolaget L M Ericsson (publ), Stockholm (SE)

(72) Inventors: Haochuan Zhang, Beijing (CN); Yang Hu, Beijing (CN); Hong Shen, Nanjing (CN); Wei Xu, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 325 days.

(21) Appl. No.: 14/375,481

(22) PCT Filed: Nov. 12, 2012

(86) PCT No.: PCT/SE2012/051231
§ 371 (c)(1),
(2) Date: Jul. 30, 2014

(87) PCT Pub. No.: WO2013/115697
PCT Pub. Date: Aug. 8, 2013

(65) Prior Publication Data
US 2015/0030007 A1    Jan. 29, 2015

(30) Foreign Application Priority Data

Feb. 3, 2012    (WO) ................ PCT/CN2012/070864

(51) Int. Cl.
*H04J 3/00*    (2006.01)
*H04L 5/14*    (2006.01)
(Continued)

(52) U.S. Cl.
CPC ........ *H04W 72/0446* (2013.01); *H04B 7/024* (2013.01); *H04B 7/043* (2013.01);
(Continued)

(58) Field of Classification Search
CPC ................ H04L 25/0204; H04W 72/0446
See application file for complete search history.

(56) References Cited

U.S. PATENT DOCUMENTS 8,351,521 B2 *  1/2013  Lakkis .............. H04B 7/0491
                                                      375/260
2010/0246457 A1   9/2010  Zhou et al.
(Continued)

FOREIGN PATENT DOCUMENTS

CN    101399590 A    4/2009
CN    101984571 A    3/2011
(Continued)

OTHER PUBLICATIONS

Mitsubishi Electric, "Leakage-based precoding for CoMP in LTE-A", 3GPP RAN1#55b, Jan. 12, 2009, pp. 1-13, R1-090028, Ljubljana, Slovenia.
(Continued)

*Primary Examiner* — Gerald Smarth
(74) *Attorney, Agent, or Firm* — Coats & Bennett, P.L.L.C.

(57) ABSTRACT

A user equipment, UE, (300), a radio base station, RBS, (400) and a respective method (100) and (200) therein for joint transmit and receive procedure are provided. The method (100) in the UE comprises receiving (110) at a time slot n, a first transmission from the RBS, the transmission comprising a first pre-coded symbol; and estimating (120) a real channel referring to a transfer function of the channel and an effective channel referring to the real channel adjusted by transmission weights for the received first transmission. The method further comprises determining (130) a combining vector based on the effective channel, and determining (140) a feedback vector based on the combining vector and the real channel. The method comprises transmitting (150) the feedback vector to the RBS, to be used by (Continued)

the RBS for determining an SLNR pre-coding vector for a second transmission to the UE in a subsequent time slot.

16 Claims, 8 Drawing Sheets

(51) Int. Cl.
| | |
|---|---|
| *H04W 72/04* | (2009.01) |
| *H04L 25/02* | (2006.01) |
| *H04L 25/03* | (2006.01) |
| *H04B 7/0456* | (2017.01) |
| *H04B 7/06* | (2006.01) |
| *H04B 7/08* | (2006.01) |
| *H04B 7/024* | (2017.01) |
| *H04B 7/04* | (2017.01) |
| *H04B 7/0452* | (2017.01) |
| *H04L 5/00* | (2006.01) |

(52) U.S. Cl.
CPC ........... *H04B 7/046* (2013.01); *H04B 7/0452* (2013.01); *H04B 7/0456* (2013.01); *H04B 7/0617* (2013.01); *H04B 7/0619* (2013.01); *H04B 7/0626* (2013.01); *H04B 7/0632* (2013.01); *H04B 7/0634* (2013.01); *H04B 7/0842* (2013.01); *H04B 7/0854* (2013.01); *H04L 25/0204* (2013.01); *H04L 25/03949* (2013.01); *H04L 5/0035* (2013.01)

(56) References Cited

U.S. PATENT DOCUMENTS

| | | | | |
|---|---|---|---|---|
| 2011/0134859 A1* | 6/2011 | Li | ........................ | H04B 7/0452 370/329 |
| 2011/0134902 A1* | 6/2011 | Ko | ........................ | H04B 7/0434 370/344 |
| 2011/0170623 A1 | 7/2011 | Park et al. | | |
| 2011/0319027 A1* | 12/2011 | Sayana | ................ | H04B 7/0632 455/67.11 |
| 2013/0155891 A1* | 6/2013 | Dinan | .................. | H04B 7/0456 370/252 |

FOREIGN PATENT DOCUMENTS

| | | |
|---|---|---|
| CN | 101621813 B | 12/2011 |
| EP | 2410781 A1 | 1/2012 |
| WO | 2011022415 A1 | 2/2011 |

OTHER PUBLICATIONS

Sadek, M. et al., "A Leakage-Based Precoding Scheme for Downlink Multi-User MIMO Channels", IEEE Transactions on Wireless Communications, May 1, 2007, pp. 1711-1721, vol. 6, No. 5, IEEE.

Peel, C., et al., "A Vector-Perturbation Technique for Near-Capacity Multiantenna Multiuser Communication—Part I: Channel Inversion and Regularization", IEEE Transactions on Communications, Jan. 1, 2005, pp. 195-202, vol. 53, No. 1, IEEE.

Spencer, Q., et al., "Zero-Forcing Methods for Downlink Spatial Multiplexing in Multiuser MIMO Channels", IEEE Transactions on Signal Processing, Feb. 1, 2004, pp. 461-471, vol. 52, No. 2, IEEE.

Yoo, T., et al., "On the Optimality of Multiantenna Broadcast Scheduling Using Zero-Forcing Beamforming", IEEE Journal on Selected Areas in Communications, Mar. 1, 2006, pp. 528-541, vol. 24, No. 3, IEEE.

Weingarten, H., et al., "The Capacity Region of the Gaussian Multiple-Input Multiple-Output Broadcast Channel", IEEE Transactions on Information Theory, Sep. 1, 2006, pp. 3936-3964, vol. 52, No. 9, IEEE.

Choi, L-U, et al., "A Transmit Preprocessing Technique for Multiuser MIMO Systems Using a Decomposition Approach", IEEE Transactions on Wireless Communications, Jan. 1, 2004, pp. 20-24, vol. 3, No. 1, IEEE.

Zhang, J., et al., "Mode Switching for the Multi-Antenna Broadcast Channel Based on Delay and Channel Quantization", Research Article, EURASIP Journal on Advances in Signal Processing, Jun. 7, 2009, pp. 1-15, vol. 2009, Springer Open.

Amara, M., et al., "Receiver and Transmitter Iterative Optimization Using Maximum Sum-Rate Criterion for Multi-User MIMO Systems", Proceedings of the 4th International Symposium on Communications, Control and Signal Processing, Limassol, Cyprus, Mar. 3, 2010, pp. 1-6, IEEE.

LG Electronics Inc., "System level performance with CoMP CB," 3GPP TSG RAN WG1 Meeting #60, Agenda Item 7.2.5, R1-101354, Feb. 22-26, 2010, pp. 1-6, 3GPP, San Francisco, USA.

NTT Docomo "System Performance of CS/CB-CoMP in Scenario 3," 3GPP TSG RAN WG1 Meeting #66, Agenda Item 6.5.1, R1-112722, Aug. 22-26, 2011, pp. 1-7, 3GPP, Athens, Greece.

* cited by examiner

| Number of transmit antennas | 4 |
|---|---|
| Number of receive antennas | 2 |
| Number of users | 3 |
| Number of data stream per user | 1 |
| Channel mode | Gauss-Markov block fading |
| Normalised Doppler frequency | 0.1 |
| Receive algorithm | MF |

JOINT TRANSMIT AND RECEIVE PROCEDURE

TECHNICAL FIELD

The present disclosure relates to a user equipment, a radio base station and respective methods therein for communication between the user equipment and the UE; and in particular to user equipment, a radio base station and respective methods therein for joint transmit and receive procedure.

BACKGROUND

Generally, in wireless or radio communication networks, transmissions between radio base stations, RBSs, and user equipments, UEs, are affected by a plurality of circumstances and conditions. For example, the distance between an RBS and a UE may be short or long, which may affect the transmission such that higher transmission power is needed when the distance is relatively long as compared to when the distance is relatively short. Further, the presence of buildings, trees and other objects may cause reflections and other adverse affects to the signal being transferred from the RBS to the UE. Still further, the interference situation caused by other UEs and neighbouring RBSs may adversely affect the transmission.

There may further be other reasons for enhancing or improving the performance of the RBSs and UEs in a wireless or radio communication network. It is desirable to optimise the use of the available resources in the communication system.

One solution to enhance or improve the performance of the RBSs and UEs in a wireless or radio communication network is to employ pre-coding at the RBS before transmission of signals and/or data to one or more UEs. One example of pre-coding is Signal-to-Leakage- and-Noise-Ratio, SLNR. The SLNR pre-coding can offer relatively high performance by taking both multiuser interference and noise into account. On the other hand, the leakage-based optimization criterion adopted by SLNR pre-coding may yield a closed form solution. One shortcoming of the SLNR pre-coding is that it only tries to optimize the transmitter design without considering the impact of receivers.

In order to improve the SLNR pre-coding scheme, iterative SLNR pre-coding has been suggested. One example of an iterative SLNR pre-coding method is based on the maximum sum-rate criterion. The scheme jointly optimizes the precoder and the receiver in an iterative manner, and provides higher sum rate than that of conventional non-iterative SLNR pre-coding. However, the algorithm still has the following drawbacks.

One drawback is that the base station requires the full channel information of each user, which is not Frequency Division Duplex, FDD, friendly. Although channel reciprocity may be utilized in single-cell Time Division Duplex, TDD, transmission, a large amount of Channel State Information, CSI, will be exchanged between adjacent cells in multi-cell TDD systems, which inevitably increases processing latency at the base station, as well as the traffic load at the X2 interface. Therefore, for multi-cell or Coordinated Multipoint Transmission, CoMP, systems, the iterative algorithm is not a favourable choice.

Another drawback is that the RBS needs to know the UE's detection algorithm in advance. This assumption is indeed impractical since the detection algorithm adopted by each UE is proprietary.

Still a further drawback is that the iterative procedure may not converge, or converge very slowly, which leads to high computational complexity and processing delay.

SUMMARY

The object is to obviate at least some of the problems outlined above. In particular, it is an object to provide a user equipment, a radio base station and a respective method therein for joint transmit and receive procedure, wherein the user equipment receives a transmission from the radio base station at time slot n, wherein the user equipment determine a feedback vector based on the received transmission and transmits the determined feedback vector to the radio base station. The radio base station may then determine a pre-coding vector based on the feedback vector, pre-code a symbol for a subsequent transmission using the determined pre-coding vector and transmit the pre-coded symbol at a time slot n+1. These objects and others may be obtained by providing a user equipment and a method therein; and a radio base station and a method therein according to the independent claims attached below.

According to an aspect a method in a user equipment, UE, for joint transmit and receive procedure with a radio base station, RBS, is provided. The method comprises receiving at a time slot n, a first transmission from the RBS, the transmission comprising a first pre-coded symbol; and estimating a real channel referring to a transfer function of the channel estimated by the UE by means of reference signals and an effective channel referring to the real channel adjusted by transmission weights for the received first transmission. The method further comprises determining a combining vector based on the effective channel, and determining a feedback vector based on the combining vector and the real channel. Still further, the method comprises transmitting the feedback vector to the RBS, to be used by the RBS for determining an SLNR pre-coding vector for a second transmission to the UE in a subsequent time slot.

According to an aspect a method in a radio base station, RBS, for joint transmit and receive procedure with K numbers of user equipments, UEs, K≥1, is provided. The method comprises transmitting at a time slot n−1, a first respective transmission to the K UEs, each transmission comprising an individual first pre-coded symbol. The method further comprises receiving individual feedback vectors, at time slot n, from at least a part of the UEs having determined their respective feedback vectors based on the respective first transmission. The method comprises determining individual SLNR pre-coding vectors for the UEs based on the received feedback vectors and pre-coding, for respective UEs, a second individual symbol using the respective individual determined SLNR pre-coding vector. The method further comprises transmitting, at time slot n+1, the respective pre-coded second symbol in a second transmission to the UEs.

According to an aspect, a user equipment, UE, adapted for joint transmit and receive procedure with a radio base station, RBS, is provided. The UE comprises a receiving module adapted to receive at a time slot n, a first transmission from the RBS, the transmission comprising a first pre-coded symbol. The UE further comprises an estimating module adapted to estimate a real channel referring to a transfer function of the channel estimated by the UE by means of reference signals and an effective channel referring to the real channel adjusted by transmission weights for the received first transmission. Still further, the UE comprises a determining module adapted to determine a combining vector based on the effective channel, and to determine a feedback vector based on the combining vector and the real channel; and a transmitting module adapted to transmit the feedback vector to the RBS, to be used by the RBS for determining an SLNR pre-coding vector for a second transmission to the UE in a subsequent time slot.

According to an aspect, a radio base station, RBS, adapted for joint transmit and receive procedure with K numbers of user equipments, UEs, K≥1, is provided. The RBS comprises a transmitting module adapted to transmit at a time slot n−1, a first respective transmission to the K UEs, each transmission comprising an individual first pre-coded symbol; and a receiving module adapted to receive individual feedback vectors, at time slot n, from at least a part of the UEs having determined their respective feedback vectors based on the respective first transmission. The RBS further comprises a determining module adapted to determine individual SLNR pre-coding vectors for the UEs based on the received feedback vectors; and a pre-coding module adapted to pre-code for respective UEs, a second individual symbol using the respective individual determined SLNR pre-coding vector. The transmitting module further is adapted to transmit at time slot n+1, the respective pre-coded second symbol in a second transmission to the UEs.

The UE, the RBS and the respective method therein have several advantages. One advantage is that the performance in downlink may be improved compared to conventional SLNR pre-coding with comparable complexity. By exploiting the temporal channel correlation, there is no need for an iterative procedure. To the contrary, the constraint on the receiver algorithm is loosen because the feedback information already comprise the combining vector. Another advantage is that the method may be applied in multi-cell systems as well as in single-cell systems.

BRIEF DESCRIPTION OF DRAWINGS

Embodiments will now be described in more detail in relation to the accompanying drawings, in which.

DETAILED DESCRIPTION

Briefly described, exemplifying embodiments of a method in a UE, a method in an RBS, a UE and a RBS are provided for joint transmit and receive procedure. The joint transmit and receive procedure comprises in short the UE, UE, receiving a transmission from the RBS wherein the UE determines a feedback vector based on the received transmission. The joint transmit and receive procedure comprises in short the RBS sending a transmission to the UE, receiving a feedback vector relating to the sent transmission and the RBS using the received feedback vector for pre-coding a second transmission and then sending the pre-coded second transmission to the UE.

Embodiments of a method in a UE for joint transmit and receive procedure with an RBS will now be described with reference to FIG. 1.

Figure 1:
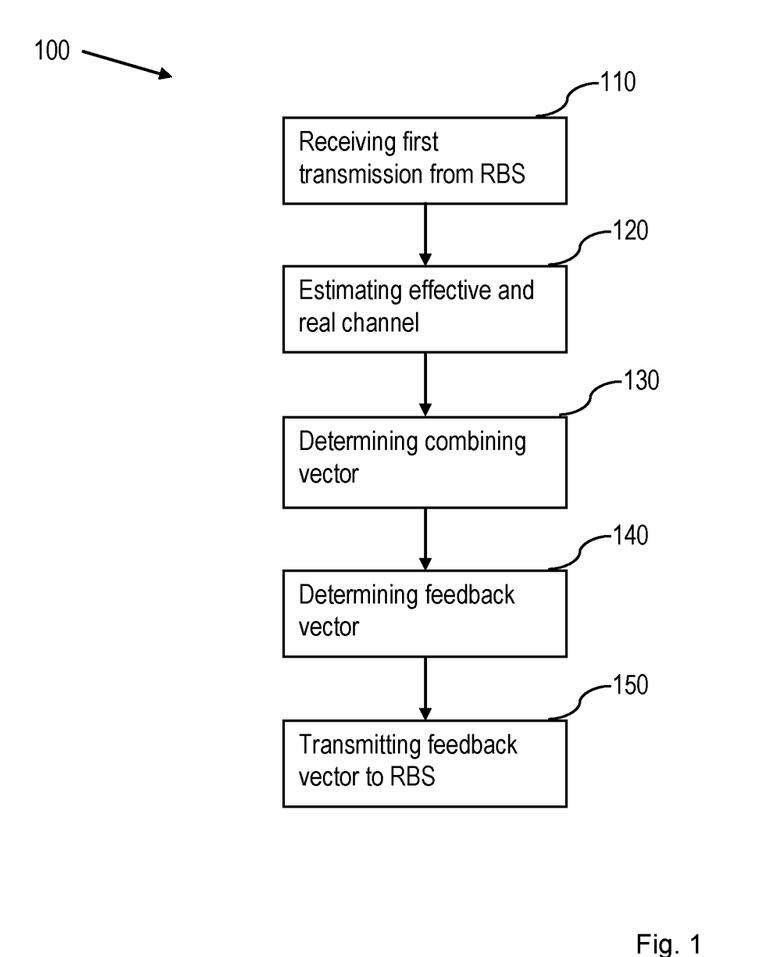
FIG. 1 is a flowchart of an exemplifying method in a UE for joint transmit and receive procedure with an RBS, according to an embodiment.

FIG. 1 is illustrates the method 100 in the UE for joint transmit and receive procedure with an RBS comprising receiving 110 at a time slot n, a first transmission from the RBS, the transmission comprising a first pre-coded symbol; and estimating 120 a real channel referring to a transfer function of the channel estimated by the UE by means of reference signals and an effective channel referring to the real channel adjusted by transmission weights for the received first transmission. The method further comprises determining 130 a combining vector based on the effective channel, and determining 140 a feedback vector based on the combining vector and the real channel. Still further, the method comprises transmitting 150 the feedback vector to the RBS, to be used by the RBS for determining an SLNR pre-coding vector for a second transmission to the UE in a subsequent time slot.

At a time slot n, the UE receives 100 a transmission from the RBS, the transmission comprising a first pre-coded symbol. The symbol or symbols are have been pre-coded in the RBS before the symbol(s) is transmitted to the UE. The pre-coding is generally performed in order to e.g. improve performance of the radio communication between the RBS and the UE.

From the received transmission, at time slot n, the UE estimates a real channel referring to a transfer function of the channel estimated by the UE by means of reference signals. The transfer function can be said to be a measure of how the channel affects or transfers the transmission from the RBS to the UE. The transfer function is dependent upon several different factors. For example, the presence of buildings, trees and other objects may cause reflections and other affects to the signal being transferred from the RBS to the UE. Further, the interference situation, the distance between the RBS and the UE are other factors that may affect the transfer function.

From the received transmission, at time slot n, the UE also estimates an effective channel referring to the real channel adjusted by transmission weights for the received first transmission. In other words, the effective channel is estimated by a UE from e.g. pilots or reference signals that are spatially pre-coded together with data at the RBS before transmission of the signal or signals. For "effective channel", as the pilot or reference signal is added before the spatial pre-coding process, the channel as seen or estimated by the UE is no longer the physical channel (between the RBS and the UE), but a concatenation (or multiplication) of the physical channel and a spatial pre-coding matrix. For this reason, with spatial pre-coding at the transmitter, the channel as seen or estimated by the UE is an "effective" channel, rather than the real raw physical channel. In contrast. For non-pre-coded transmission, the channel a UE sees or estimates from the non-pre-coded pilots is still the real and raw physical channel. In systems for example like LTE, spatial pre-coding is only defined for specific antenna ports, DeModulation Reference Signals, DM-RS ports. No pre-coding is allowed for other ports, i.e. Common Reference Signals, CRS, ports and Channel State Information Reference Signals, CSI-RS, ports. Such information is known to the UE. Thus, the UE may assume that the channel estimated from CRS or CSI-RS is the "real channel" and the channel estimated from DM-RS is the "effective channel".

Once the real channel and the effective channel have been estimated by the UE, the UE determines a combining vector based on the effective channel, and the UE determines a feedback vector based on the combining vector and the real channel. In this manner, the UE determines a feedback vector which is dependent on the received transmission and the transfer function of the channel among other factors.

The UE then transmits the feedback vector to the RBS, to be used by the RBS for determining an SLNR pre-coding vector for a second transmission to the UE in a subsequent time slot. In other words, the conditions of the radio channel at time slot n affect the pre-coding performed by the RBS for a transmission in the subsequent time slot. In this manner, the conditions of the radio channel at time slot n are determined or estimated by the UE, and the UE informs the RBS of the current conditions wherein the RBS is enabled to optimise the pre-coding for the next subsequent transmission with regards to the current conditions of the radio channel.

In this manner, reception of a transmission at time slot n at the UE(s) affects the transmission at time slot n+1 at the RBS. The transmission that was received at time slot n at the UE(s) was transmitted from the RBS at time slot n−1.

This has several advantages. One advantage is that the performance in downlink may be improved compared to conventional SLNR pre-coding with comparable complexity. By exploiting the temporal channel correlation, there is no need for an iterative procedure. To the contrary, the constraint on the receiver algorithm is loosen because the feedback information already comprise the combining vector. Another advantage is that the method may be applied in multi-cell systems as well as in single-cell systems.

According to an embodiment, the UE uses a Matched Filter, MF, receiver, wherein the combining vector, g[n], is determined as g[n]=H[n]w[n], in which w[n] is an SLNR pre-coding vector at time slot n and H[n] is the real channel at time slot n.

Assume that there are K UEs in total currently being connected to the RBS. At time slot n, the k:th UE determines the combining vector, $g_k[n]$, as $$g_k[n]=H_k[n]w_k[n]. \quad (1)$$

In this example, the real channel at time slot n for the k:th UE is $H_k[n]$ and the SLNR pre-coding vector at time slot n for the k:th UE is $w_k[n]$. The k:th UE estimates the effective channel as $H_k[n]w_k[n]$. As can be seen, the effective channel and the combining vector are one and the same in this example.

According to an embodiment, the UE uses Minimum-Mean-Square-Error, MMSE, receiver, wherein the combining vector, g[n], is determined as $g[n]=(\Sigma_{j=1}^{K}=H[n]w_j^H[n]H^H[n]+N_0I_{N_R})^{-1}H[n]w[n]$, where K is the number of UEs currently receiving transmissions from the RBS at time slot n, $H^H[n]$ is the Hermitian transposition of the real channel at time slot n, H[n] is the real channel at time slot n, w[n] is a, SLNR pre-coding vector at time slot n, w[n] is a conjugate transposition of the SLNR precoding vector at time slot n for UE j, $N_0$ is the noise power of each antenna employed by the UE, and $I_{N_R}$ is an $N_R*N_R$ identity matrix in which $N_R$ is the number of antennas employed by the UE.

This is another example of how the UE may determine the combining vector, g[n]. The way in which the combining vector is determined thus depends on the receiver of the UE. In this example, the combining vector is determined differently than for a MF receiver. For the MMSE receiver, the real channel is estimated in the same manner as for the MF receiver. For the individual UE k the combining vector may be determined by:

$$g_k[n]=(\Sigma_{j=1}^{K}H_k[n]w_j[n]H_k^H[n]+N_0I_{N_R})^{-1}H_k[n]w_k[n]. \quad (2)$$

where k=1, . . . , K

According to an embodiment, the feedback vector, t[n], is determined as t[n]=$H^H$[n] g[n].

This means that once the real channel has been estimated and the combining vector has been determined, the UE may determine the feedback vector t[n] to be t[n]=$H^H$[n]g[n]. For the k:th UE, the feedback vector $t_k[n]$, may be determined as $$t_k[n]=H_k^H[n]g_k[n] \quad (3)$$

As described above, the real channel at time slot n is estimated and denoted by H[n]. From this, the Hermitian transposition of the real channel at time slot n may be determined and it is denoted $H^H$[n]. Once the Hermitian transposition of the real channel at time slot n and the combining vector are determined, the UE may determine the feedback vector to be sent to the RBS so that the RBS may make use of the feedback vector when determining an SLNR pre-coding vector for a subsequent transmission to the UE in time slot n+1.

Embodiments herein also relate to a method in an RBS for joint transmit and receive procedure with K numbers of UEs, K≥1. Such embodiments will now be described with reference to FIG. 2.

Figure 2:
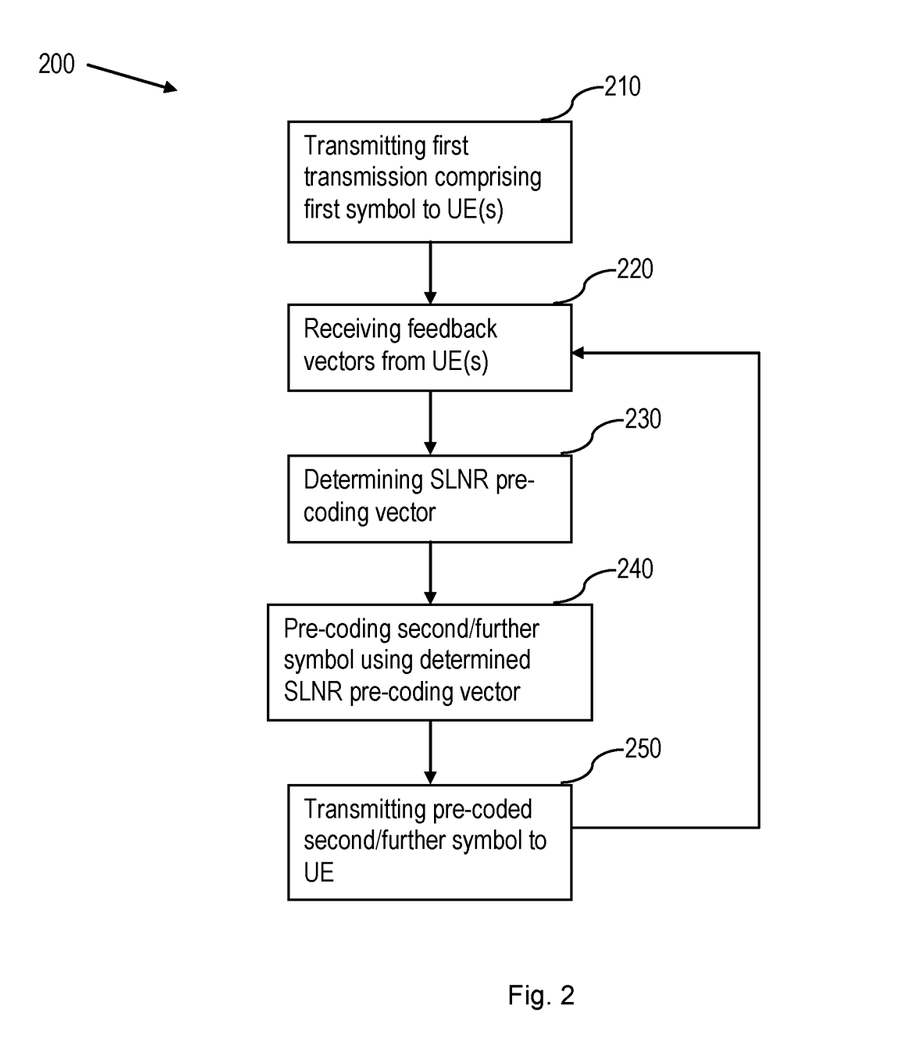
FIG. 2 is a flowchart of an exemplifying method in an RBS for joint transmit and receive procedure with K numbers of UEs, according to an embodiment.

FIG. 2 illustrates the method in an RBS for joint transmit and receive procedure with K numbers of UEs, K≥1, comprising transmitting 210 at a time slot n−1, a first respective transmission to the K UEs, each transmission comprising an individual first pre-coded symbol. The method further comprises receiving 220 individual feedback vectors, at time slot n, from at least a part of the UEs having determined their respective feedback vectors based on the respective first transmission. The method comprises determining 230 individual SLNR pre-coding vectors for the UEs based on the received feedback vectors and pre-coding 240, for respective UEs, a second individual symbol using the respective individual determined SLNR pre-coding vector. The method further comprises transmitting 250, at time slot n+1, the respective pre-coded second symbol in a second transmission to the UEs.

The RBS is serving K number of UEs. By serving means that the K number of UEs are receiving transmissions from the RBS. The RBS transmits, at time slot n−1, a transmission to the UEs. For simplicity, this transmission is denoted the first transmission. As having been described above, the UEs each determine a feedback vector which is specific for each UE. Each UE then transmits its individual feedback vector to the RBS at time slot n. Once the RBS receives these feedback vectors from the UEs, the RBS can be said to be told how the different UEs are experiencing their respective radio channel. The RBS receives, from the UEs, the feedback vectors regarding the first transmission which the RBS just has transmitted. The RBS uses the received feedback vector to determine individual SLNR pre-coding vectors for the UEs. This means that the RBS tries to improve, or retain, the quality of the first transmission by analysing the feedback vectors and then adjust the individual SLNR pre-coding vectors for the UEs accordingly. In case a UE experiences "perfect" quality, the RBS may not change the SLNR pre-coding vector for that UE.

Once the RBS has determined individual SLNR pre-coding vectors for the UEs, the RBS pre-codes, for respective UEs, a second individual symbol using the respective individual determined SLNR pre-coding vector. This means that a subsequent symbol which is to be sent in a second transmission, i.e. in time slot n+1, is pre-coded using the respective individual determined SLNR pre-coding vector. It shall be pointed out that by individual symbol is intended that each UE receives individual transmissions so that not the same symbol is transmitted to all UEs.

Thereafter, the RBS transmits, at time slot n+1, the respective pre-coded second symbol in a second transmission to the UEs.

The method in the RBS is cooperating with the method in the UE and hence has the same advantages. One advantage is that the performance in downlink may be improved compared to conventional SLNR pre-coding with comparable complexity. By exploiting the temporal channel correlation, there is no need for an iterative procedure. To the contrary, the constraint on the receiver algorithm is loosen because the feedback information already comprise the combining vector. Another advantage is that the method may be applied in multi-cell systems as well as in single-cell systems.

According to an embodiment, the SLNR pre-coding vector for UE k is determined as $$w_k[n+1] = \xi_{max}[(N_R N_0 I_{N_T} \tilde{t}_k[n] \tilde{t}_k^H[n])^{-1} t_k[n] t_k^H[n]]. \quad (4)$$

where $\xi_{max}[-]$ denotes a mathematical operation which returns the eigenvector corresponding to the largest eigenvalue of a matrix, $N_0$ is the noise power of each antenna employed by the UE, and $I_{N_T}$ is an $N_T*N_T$ identity matrix in which $N_T$ is the number of antennas at the RBS, $t_k[n]$ is the feedback vector at time slot n for UE k, $t_k^H[n]$ is the conjugate transposition of the feedback vector, $\tilde{t}_k[n]=[t_1[n], \ldots, t_{k+1}[n], t_{k+1}[n], \ldots, t_K[n]]$ is a matrix consisting of feedback vectors at time slot n for all UEs being served by the RBS except UE k, and, $\tilde{t}_k^H[n]$ is the Hermitian transposition of the matrix $\tilde{t}_k[n]$.

In the previous transmission, i.e. the transmission which for simplicity reasons has been referred to above as the first transmission, the SLNR pre-coding vector for UE k was determined as $w_k[n]$. The UE k determined a feedback vector $t_K[n]$ which was sent to the RBS. This feedback vector is now used by the RBS to determine an SLNR pre-coding vector for a subsequent or second transmission to UE k in time slot n+1, $w_k[n+1]$. The $N_R$, $N_0$ and $I_{NT}$ are all known to the RBS. The $t_k^H[n]$ which is the conjugate transposition of the feedback vector is determined by the RBS and the RBS may determine individual matrixes consisting of feedback vectors at time slot n for all UEs being served by the RBS except UE k by $\tilde{t}_k[n]=[t_1[n], \ldots, t_{k+1}[n], t_{k+1}[n], \ldots, t_K[n]]$. From this, the RBS may determine an SLNR pre-coding vector for a subsequent or second transmission to UE k in time slot n+1, $w_k[n+1]$ using the equation above.

Each UE receiving transmission from the RBS, determines its own feedback vector according to equation (3). The feedback vector is then transmitted from each of the UEs to the RBS so that the RBS may use the feedback vector when determining a pre-coding vector for a subsequent transmission from the RBS to the UEs. This simplifies the iterative procedure of joint pre-coding and detection optimisation by exploiting the temporal channel correlation and an equivalent channel information feedback.

Based on this joint optimization structure, an issue is to further develop a robust pre-coding optimization against the feedback delay. Note that the Gauss-Markov block fading model is adopted for the robust design and an MF receiver is assumed to be applied for simplicity. The conditional mean of SLNR is maximized to obtain the beamforming vector $\tilde{w}_k[n+1]$.

According to an embodiment, the method further comprises determining a beam forming vector for time slot n+1 as $$\tilde{W}_k[n+1] = \xi_{max}[(N_R N_0 I_{N_T} + \tilde{F}_k[n])^{-1} F_k[n]] \quad (5)$$

where $$\tilde{F}_k[n] = \Sigma_{j=1,j\neq k}^K F_j[n]. \quad (6)$$

in which $F_j[n]$ represents a modified version of a correlation of the feedback vector employed by UE j and $\tilde{F}_k[n]$ represents a modified information of interference correlation which is the summation of $F_j[n]$ with $j \neq k$.

The modified version $F_j[n]$ of the correlation of the feedback vector employed by UE j is obtained by the RBS by:

$$F_k[n] = \rho^4 H_k^H[n] H_k[n] w_k[n] w_k^H[n] H_k^H[n] H_k[n] +$$
$$\rho^2(1-\rho^2) N_R w_k[n] w_k^H[n] H_k^H[n] H_k[n] +$$
$$\rho^2(1-\rho^2) N_R H_k^H[n] H_k[n] w_k[n] w_k^H[n] +$$
$$N_R(1-\rho^2)^2 (N_R w_k[n] w_k^H[n] + diag(w_k^H[n] w_k[n])) +$$
$$\rho^2(1-\rho^2) N_R w_k^H[n] H_k^H[n] H_k[n] w_k[n] I_{N_T} +$$
$$\rho^2(1-\rho^2) w_k^H[n] w_k[n] H_k^H[n] H_k[n]$$

In the equation above, the derivations are left out for simplicity reasons. The term $\rho^2(1-\rho^2) w_k[n] w_k[n] H_k^H[n] H_k[n]$ cannot be expressed with $t_K[n]$ and is omitted as an approximation. Thus we get:

$$F_k'[n] = \rho^4 t_k[n] t_k^H[n] + \rho^2(1-\rho^2) N_R w_k[n] t_k^H[n] + \rho^2(1-\rho^2) N_R t_k[n] w_k^H[n] + N_R(1-\rho^2)^2 (N_R w_k[n] w_k^H[n] + diag(w_k^H[n] w_k[n])) + \rho^2(1-\rho^2) t_k^H[n] w_k[n] I_{N_T} \quad (7)$$

The corresponding beamforming factor is $$\tilde{w}_k'[n+1] = \xi_{max}[(N_R N_0 I_{N_T} \Sigma_{j=1,j\neq k}^K F_j'[n])^{-1} F_j'[n]] \quad (8)$$

Thereby, a pre-coding may be determined by $$w_k[n+1] = \xi_{max}[(N_R N_0 I_{N_T} \Sigma_{j=1,j\neq k}^K f_j(t_j[n]))^{-1} f_k(t_k[n])] \quad (9)$$

In case $f_i(t_i[n]) = t_i[n] t_i^H$, then equation (9) will be equivalent to equation (4). On the other hand, when $f_i(t_i[n])$ is determined using (7), then (9) will be the same as (8).

Embodiments herein also relate to a UE adapted for joint transmit and receive procedure with an RBS. The UE has the same objects, technical features and advantages as the method performed therein. Consequently, the UE will be described in brief in order to avoid unnecessary repetition.

A UE adapted for joint transmit and receive procedure with an RBS according to an exemplifying embodiment will now be described with reference to FIG. 3.

Figure 3:
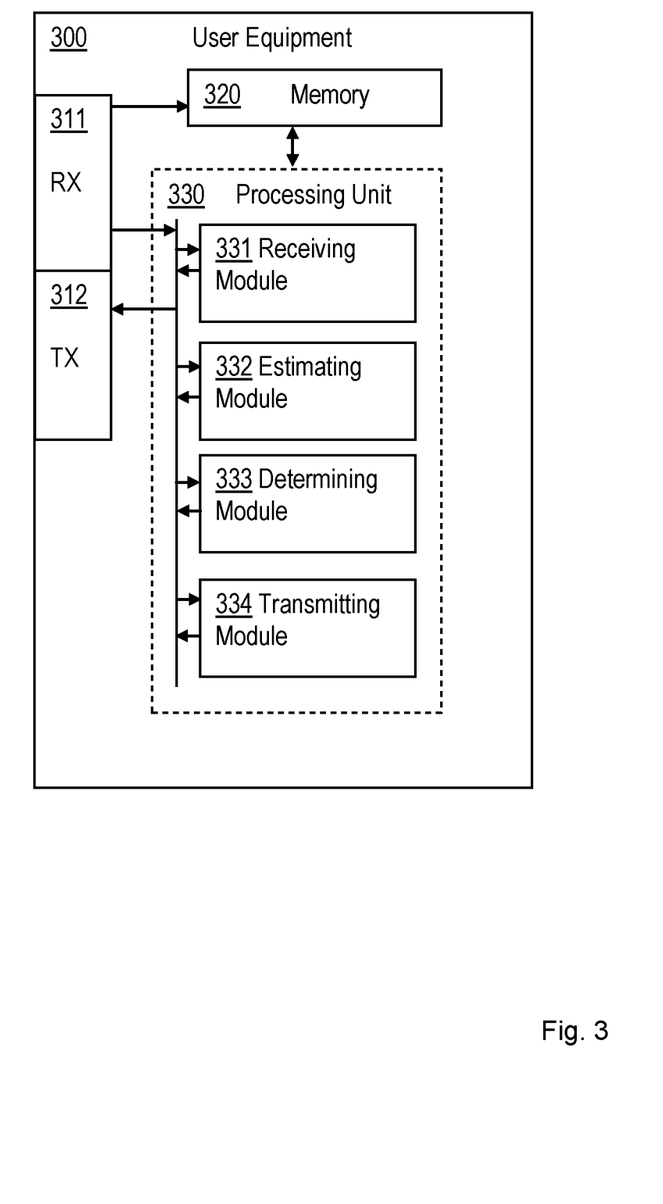
FIG. 3 is a block diagram of a UE adapted for joint transmit and receive procedure with an RBS, according to an embodiment.

FIG. 3 illustrates the UE 300 comprising a receiving module 331 adapted to receive at a time slot n, a first transmission from the RBS, the transmission comprising a first pre-coded symbol. The UE 300 further comprises an estimating module 332 adapted to estimate a real channel referring to a transfer function of the channel estimated by the UE by means of reference signals and an effective channel referring to the real channel adjusted by transmission weights for the received first transmission. Still further, the UE 300 comprises a determining module 333 adapted to determine a combining vector based on the effective channel, and to determine a feedback vector based on the combining vector and the real channel; and a transmitting module 334 adapted to transmit the feedback vector to the RBS, to be used by the RBS for determining an SLNR pre-coding vector for a second transmission to the UE in a subsequent time slot.

FIG. 3 is a schematic illustration of the UE 300. The UE 300 is also illustrated comprising a receiver arrangement 311 and a transmitter arrangement 312. These arrangements 311 and 312 may comprise e.g. one or more antenna or antenna elements. Through these arrangements 311 and 312, the UE may communicate wirelessly with e.g. a RBS. FIG. 3 further illustrates the UE 300 comprising a memory 320 which may comprise one or more memory elements for storing data or information in the UE. The modules 331-334 may e.g. be incorporated or comprised in a processing unit 330. The UE 300 may comprise other and further elements even though not illustrated in FIG. 3.

The UE has several advantages. One advantage is that the performance in downlink may be improved compared to conventional SLNR pre-coding with comparable complexity. By exploiting the temporal channel correlation, there is no need for an iterative procedure. To the contrary, the constraint on the receiver algorithm is loosen because the feedback information already comprise the combining vector. Another advantage is that the UE may be used in multi-cell systems as well as in single-cell systems.

According to an embodiment, wherein the UE is adapted to use a Matched Filter, MF, receiver, wherein the combining vector, g[n], is determined as $g[n]=H[n]w[n]$, in which $w[n]$ is an SLNR pre-coding vector at time slot n and $H[n]$ is the real channel at time slot n.

According to still an embodiment, a UE (300) according to claim 8, wherein the UE is adapted to use Minimum-Mean-Square-Error, MMSE, receiver, wherein the combining vector, g[n], is determined as $$g[n]=(\Sigma_{j=1}^{K}H[n]w_j[n]w_j^H[n]H^H[n]+N_0 I_{N_R})^{-1}H[n]w[n],$$

where K is the number of UEs currently receiving transmissions from the RBS at time slot n, $H^H[n]$ is the Hermitian transposition of the real channel at time slot n, $H[n]$ is the real channel at time slot n, $w[n]$ is an SLNR pre-coding vector at time slot n $w_j^H[n]$ is a conjugate transposition of the SLNR pre-coding vector at time slot n for UE j, $N_0$ is the noise power of each antenna employed by the UE, and $I_{N_R}$ is an $N_R*N_R$ identity matrix in which $N_R$ is the number of antennas employed by the UE.

According to yet an embodiment, the determining module 333 further is adapted to determine the feedback vector, t[n], as $t[n]=H^H[n]g[n]$ Furthermore, the UE 300 according to an embodiment, comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 330 in the UE 300 causes the UE to perform the actions e.g. of the procedure described earlier in conjunction with FIG. 1.

The computer program may be configured as a computer program code structured in computer program modules. Hence, in an exemplifying embodiment, the code means in the computer program of the UE 300 comprises a receiving module for receiving at a time slot n, a first transmission from the RBS, the transmission comprising a first pre-coded symbol. The computer program further comprises an estimating module for estimating a real channel referring to a transfer function of the channel estimated by the UE by means of reference signals and an effective channel referring to the real channel adjusted by transmission weights for the received first transmission. The computer program further comprises a determining module for determining a combining vector based on the effective channel, and to determine a feedback vector based on the combining vector and the real channel. Still further, the computer program could further comprise a transmitting module for transmitting the feedback vector to the RBS, to be used by the RBS for determining an SLNR pre-coding vector for a second transmission to the UE in a subsequent time slot. The computer program could further comprise other modules for providing other desired functionality.

The modules could essentially perform the actions of the flow illustrated in FIG. 1, to emulate the UE 300. In other words, when the different modules are executed in the processing unit 330, they may correspond to the modules 331-334 of FIG. 3.

Although the code means in the embodiment disclosed above in conjunction with FIG. 3 are implemented as computer program modules which when executed in the processing unit causes the UE 300 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the RBS.

It is to be understood that the choice of interacting units or modules, as well as the naming of the units within this disclosure are only for exemplifying purpose, and nodes suitable to execute any of the methods described above may be configured in a plurality of alternative ways in order to be able to execute the suggested procedure actions.

It should also be noted that the units or modules described in this disclosure are to be regarded as logical entities and not with necessity as separate physical entities Embodiments herein also relate to an RBS adapted for joint transmit and receive procedure with K number of UEs. The RBS has the same objects, technical features and advantages as the method performed therein. Consequently, the RBS will be described in brief in order to avoid unnecessary repetition.

An RBS adapted for joint transmit and receive procedure with K numbers of UEs, K≥1 according to an exemplifying embodiment will now be described with reference to FIG. 4.

FIG. 3 illustrates the RBS 400 comprising a transmitting module 434 adapted to transmit at a time slot n−1, a first respective transmission to the K UEs, each transmission comprising an individual first pre-coded symbol; and a receiving module 431 adapted to receive individual feedback vectors, at time slot n, from at least a part of the UEs having determined their respective feedback vectors based on the respective first transmission. The RBS 400 further comprises a determining module 432 adapted to determine individual SLNR pre-coding vectors for the UEs based on the received feedback vectors; and a pre-coding module 433 adapted to pre-code for respective UEs, a second individual symbol using the respective individual determined SLNR pre-coding vector. The transmitting module 434 further is adapted to transmit at time slot n+1, the respective pre-coded second symbol in a second transmission to the UEs.

Figure 4:
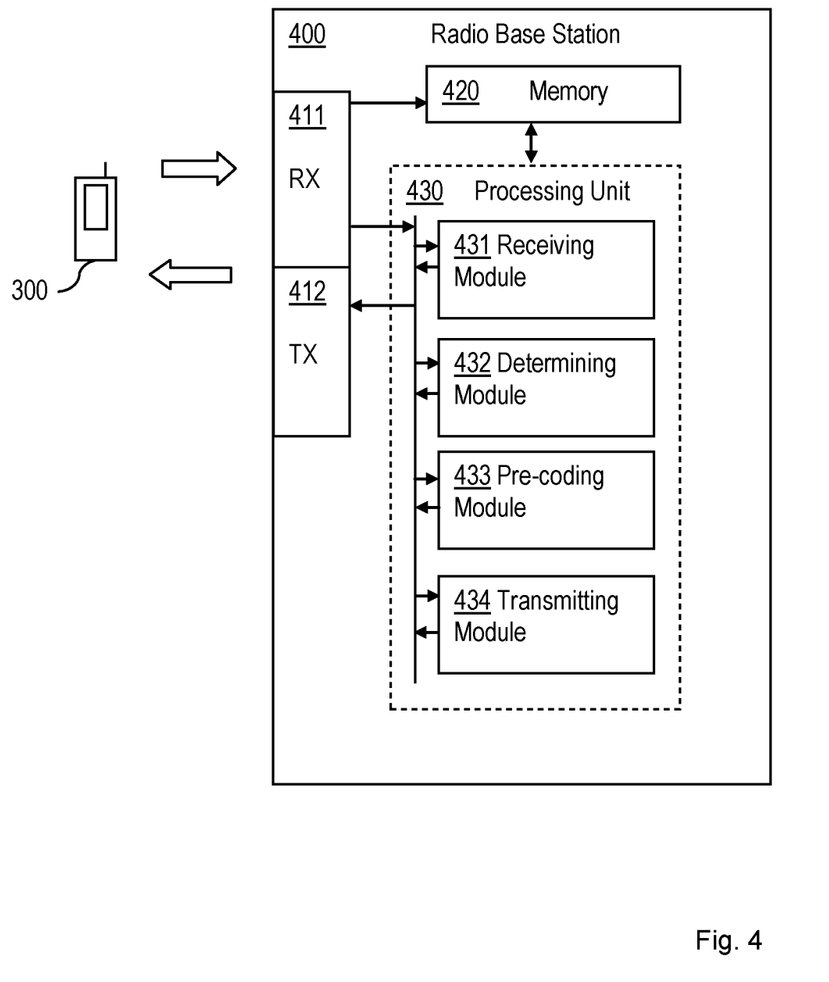
FIG. 4 is a block diagram of an RBS adapted for joint transmit and receive procedure with K numbers of UEs, according to an embodiment.

FIG. 4 is a schematic illustration of the RBS 400. The RBS 400 is also illustrated comprising a receiver arrangement 411 and a transmitter arrangement 412. These arrangements 411 and 412 may comprise e.g. one or more antenna or antenna elements. Through these arrangements 411 and 412, the RBS 400 may communicate wirelessly with e.g. a UE. FIG. 4 further illustrates the RBS 400 comprising a memory 420 which may comprise one or more memory elements for storing data or information in the RBS. The modules 431-434 may e.g. be incorporated or comprised in a processing unit 430. The RBS 400 may comprise other and further elements even though not illustrated in FIG. 4.

The RBS has several advantages. One advantage is that the performance in downlink may be improved compared to conventional SLNR pre-coding with comparable complexity. By exploiting the temporal channel correlation, there is no need for an iterative procedure. To the contrary, the constraint on the receiver algorithm is loosen because the feedback information already comprise the combining vector. Another advantage is that the RBS may be employed in multi-cell systems as well as in single-cell systems.

According to an embodiment, the determining module 432 is adapted to determine the SLNR pre-coding vector for UE k as $$w_k[n+1] = \xi_{max}[(N_R N_0 I_{N_T}[n] + \tilde{t}_k[n] \tilde{t}_k^H[n])^{-1} t_k[n] t_k^H[n]],$$

where $\xi_{max}[-]$
denotes a mathematical operation which returns the eigenvector corresponding to the largest eigenvalue of a matrix, $N_0$ is the noise power of each antenna employed by the UE, and $I_{N_T}$ is an $N_T * N_T$ identity matrix in which $N_T$ is the number of antennas at the RBS, $t_k[n]$ is the feedback vector at time slot n for UE k, $t_k^H[n]$ is the conjugate transposition of the feedback vector, $\tilde{t}_k[n] = [t_1[n], \ldots, t_{k+1}[n], t_{k+1}[n], \ldots, t_K[n]]$ is a matrix consisting of feedback vectors at time slot n for all UEs being served by the RBS except UE k, and $\tilde{t}_k^H[n]$ is the Hermitian transposition of the matrix $\tilde{t}_k[n]$.

According to still an embodiment, the determining module (432) further is adapted to determine a beam forming vector for time slot n+1 as $\tilde{w}_k[n+1] = \xi_{max}[(N_R N_0 I_{N_T} + \tilde{F}_k[n])^{-1} F_k[n]]$, where $\tilde{F}_k[n] = \Sigma_{j=1, j \neq k}^{K} F_j[n]$, in which $F_j[n]$ represents a modified version of a correlation of the feedback vector employed by UE j and $\tilde{F}_k[n]$ represents a modified information of interference correlation which is the summation of $F_j[n]$ with $j \neq k$.

Furthermore, the RBS 400 according to an embodiment, comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 430 in the RBS 400 causes the RBS to perform the actions e.g. of the procedure described earlier in conjunction with FIG. 2.

The computer program may be configured as a computer program code structured in computer program modules. Hence, in an exemplifying embodiment, the code means in the computer program of the RBS 400 comprises a transmitting module for transmitting at a time slot n–1, a first respective transmission to the K UEs, each transmission comprising an individual first pre-coded symbol. The computer program further comprises a receiving module for receiving individual feedback vectors, at time slot n, from at least a part of the UEs having determined their respective feedback vectors based on the respective first transmission. The computer program further comprises a determining module for determining individual SLNR pre-coding vectors for the UEs based on the received feedback vectors. Still further, the computer program could further comprise a pre-coding module for pre-coding, for respective UEs, a second individual symbol using the respective individual determined SLNR pre-coding vector. The computer program could further comprise other modules for providing other desired functionality.

The modules could essentially perform the actions of the flow illustrated in FIG. 2, to emulate the RBS 400. In other words, when the different modules are executed in the processing unit 430, they may correspond to the modules 431-434 of FIG. 4.

Although the code means in the embodiment disclosed above in conjunction with FIG. 4 are implemented as computer program modules which when executed in the processing unit causes the RBS 400 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the RBS.

It is to be understood that the choice of interacting units or modules, as well as the naming of the units within this disclosure are only for exemplifying purpose, and nodes suitable to execute any of the methods described above may be configured in a plurality of alternative ways in order to be able to execute the suggested procedure actions.

It should also be noted that the units or modules described in this disclosure are to be regarded as logical entities and not with necessity as separate physical entities.

Figure 5:
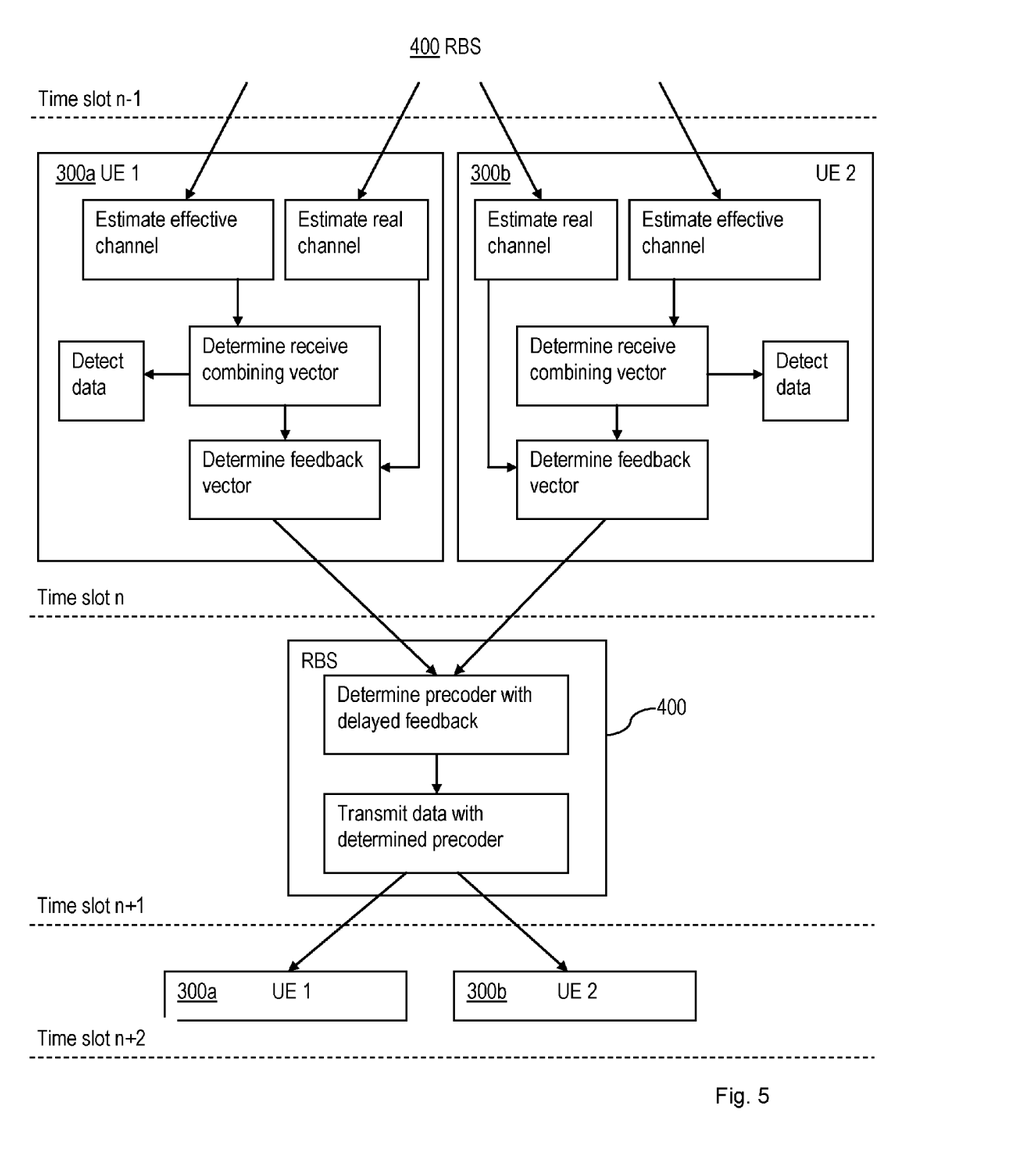
FIG. 5 is a flowchart illustrating an example of the method in UEs and an RBS.

FIG. 5 is a flowchart illustrating an example of the method in UEs and an RBS. In this figure, the number of UEs is two.

FIG. 5 illustrates that at a certain point in time, namely at time slot n–1, the two UEs, UE1 300*a* and UE2 300*b*, receive a transmission from the RBS 400.

At the top of FIG. 5, the UEs 300*a* and 300*b* are illustrated receiving the transmission from the RBS 400 by means of four arrows. It shall be noted that the RBS 400 does not transmit four different signals. To the contrary, UE1 300a receives one transmission which is received be the UE1 300a. Looking at FIG. 3, the UE1 300a may comprise a receiver arrangement 311 for receiving the one transmission at time slot n−1 from the RBS 400. The same is valid for UE2 300b.

When the respective UEs receive the transmission at time slot n−1 from the RBS 400, each UE estimates an effective channel and a real channel based on the received transmission. FIG. 5 illustrates that based on the effective channel, each UE determines a combining vector and based on the combining vector each UE may detect data comprised in the transmission from the RBS 400. FIG. 5 also illustrates each of the UEs calculating a feedback vector which is based on both the estimated real channel and the determined combine vector. Once the UEs have determined their respective feedback vector, the UEs transmits, at time slot n, the determined feedback vector to the RBS 400.

FIG. 5 illustrates the RBS 400 receiving the determined feedback vectors at time slot n, and determining a pre-coding vector with delayed feedback based on the received determined feedback vectors. When the RBS 400 has determined the pre-coding vector with delayed feedback, the RBS 400 processes data to be transmitted to the UEs and transmits the data with the computed pre-coding vector to the UEs at time slot n+1.

FIG. 5 illustrates the UEs 300a and 300b receiving the transmission at time slot n+1. It is not illustrated in FIG. 5, but the UEs 300a and 300b performs the same processing on this received transmission as the UEs performed for the previous transmission.

Figure 6:
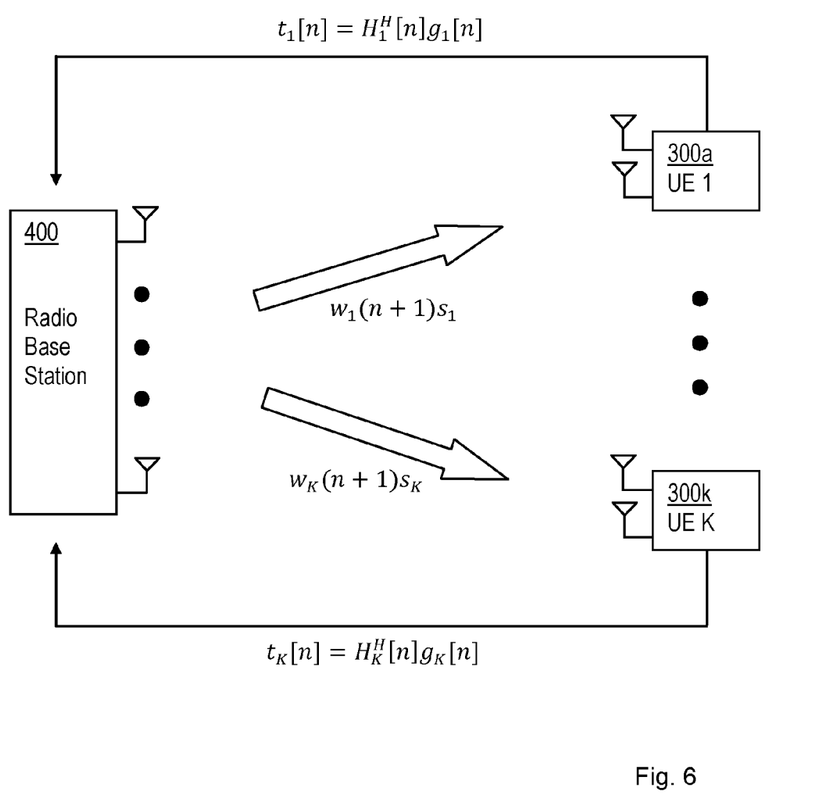
FIG. 6 is an exemplifying framework of the UEs and the RBS employing the respective method.

FIG. 6 is an exemplifying framework of the UEs and the RBS employing the respective method.

In FIG. 6, the UEs 300a-300k receive a downlink transmission from the RBS 400 at time slot n, which may be expressed as $w_k(n)s_k$, wherein $w_k(n)$ denotes the employed pre-coding vector received at time slot n and $s_k$ denotes the symbol or data which is comprised in the transmission for UE k. In FIG. 6, there are K number of UE, 300a, . . . , 300k, which receive transmissions from the RBS 400. Based in this transmission, which is not illustrated in the figure, the respective UEs determines a feedback vector for their respective received transmissions, as having been described above, and transmits the determined feedback vector to the RBS 400. This is illustrated in FIG. 6 by UE1 300a and UEK 300k transmitting $t_1[n]=H_1^H[n]g_1[n]$ and $t_K[n]=H_K^H[n]g_K[n]$ respectively. The RBS 400 uses the received feedback vectors to determine pre-coding vectors for each of the K UEs and transmits a second transmission to the UEs using the determined pre-coding, which is illustrated in FIG. 6 by $w_1(n+1)s_1$ and $w_K(n+1)s_K$ respectively. For clarity reasons it shall be pointed out that the symbol or data $s_k$ for UE k in time slot n and time slot n+1 may or may not be the same.

By exploiting the temporal channel correlation, the RBS and UE together implement an efficient pre-coding design with a modified CSI feedback strategy. The RBS and UE together perform better than a conventional SLNR pre-coding and they approach the performance of an iterative SLNR pre-coding in a non-iterative manner.

The UE, the RBS and the respective methods therein have the advantage of low processing delay and computational complexity as the method require no iterative procedure. On the other hand, the method capture most benefits of the iterative optimization algorithm which will be verified in numerical results below.

Unlike the iterative optimization algorithm, the method in the UEs is transparent to the RBS. Additionally, full channel matrix is not required to be fed back to the base stations (only the determined feedback vector is transmitted to the RBS), thus the UE, the RBS and the respective methods are also FDD friendly. For CoMP systems with TDD or FDD mode, the UE, the RBS and the respective methods only require a little channel information to be exchanged among RBSs.

The UE, the RBS and the respective methods also take into account the temporal correlation of the channel, thus providing much performance gains over the conventional SLNR pre-coding.

Figure 7:
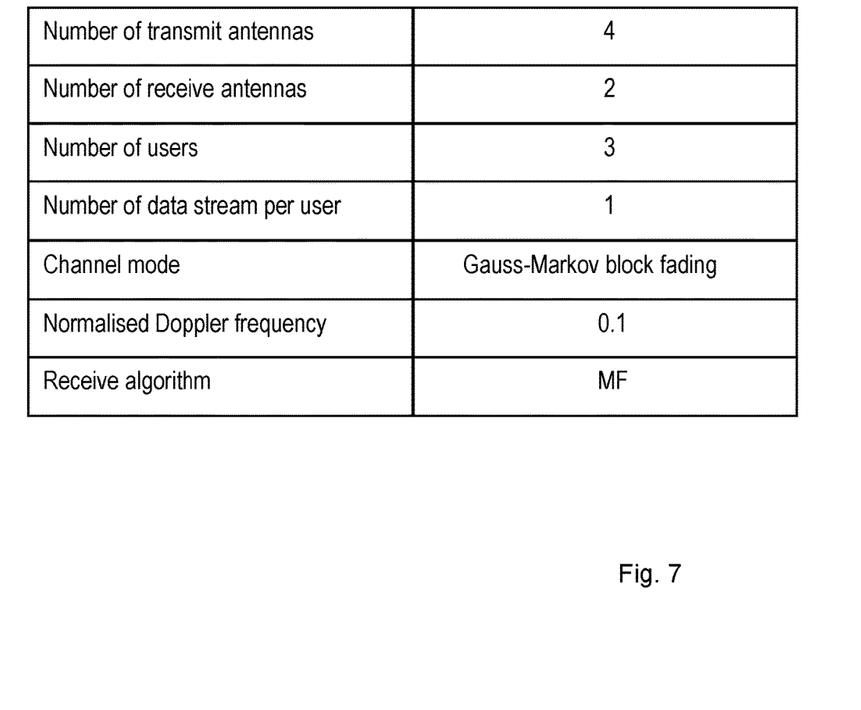
FIG. 7 is a table of exemplifying system parameters.

Below, simulations of performance for the method in the UE working together with the method in the RBS are discussed. The results of SLNR pre-coding and an iterative algorithm are also given. The sum rate is measured versus the transmit SNR. The error correction code is not considered here for simplicity. The system parameters are listed in FIG. 7.

Figure 8:
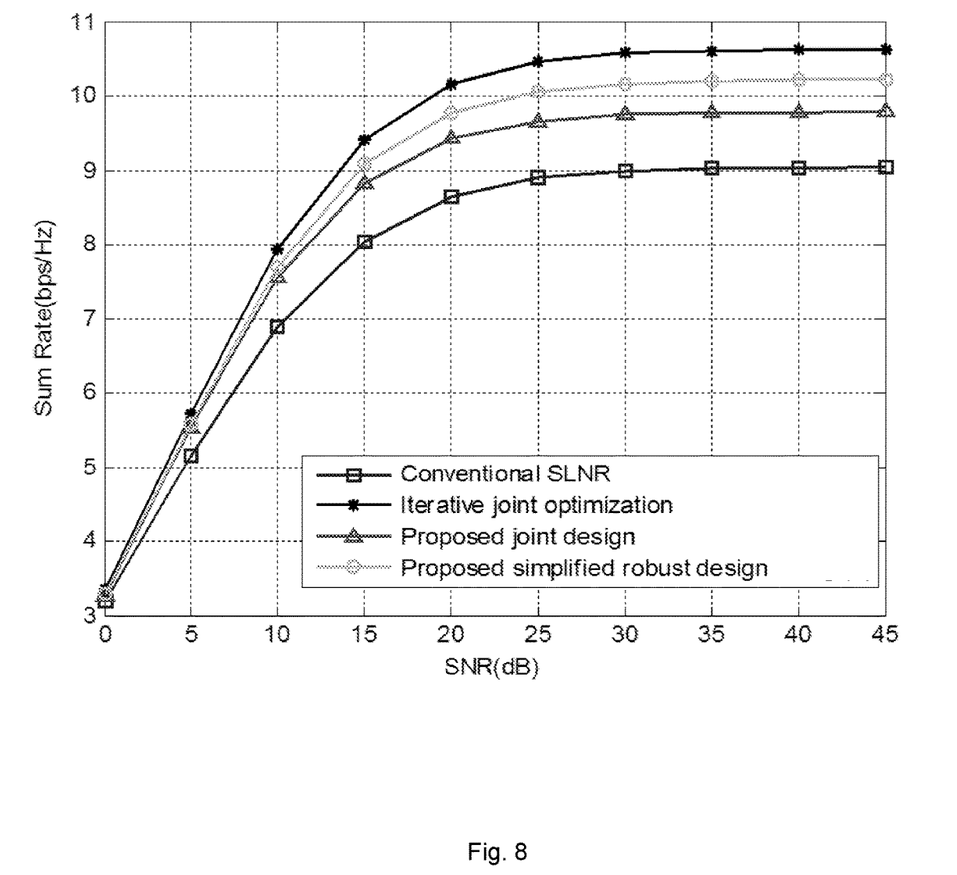
FIG. 8 illustrates graphs of different sum rates of various pre-coding schemes.

FIG. 8 illustrates the sum rate of various pre-coding schemes. As can be observed from FIG. 8, the method in the UE together with the method in the RBS provide significant performance gain over the conventional SLNR pre-coding. The method in the UE together with the method in the RBS using equation (8) approaches very close to the iterative algorithm ($\epsilon=0.001$, $i_{max}=50$) in the low and medium SNR region.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method, in a user equipment (UE), for a joint transmit and receive procedure with a radio base station (RBS), the method comprising:
   receiving a first transmission from the RBS at a time slot n, the transmission comprising a first pre-coded symbol;
   estimating a real channel and an effective channel for a channel over which the first transmission is received, the real channel referring to a transfer function estimated by the UE by means of reference signals, the effective channel referring to the real channel adjusted by transmission weights for the received first transmission;
   determining a combining vector based on the effective channel;
   determining a feedback vector based on the combining vector and the real channel;
   transmitting the feedback vector to the RBS, to be used by the RBS for determining a Signal-to-Leakage-and-Noise-Ratio (SLNR) pre-coding vector for a second transmission to the UE in a subsequent time slot.

2. The method of claim 1:
   wherein the UE uses a Matched Filter (MF) receiver;
   wherein the combining vector, g[n], is determined as $g[n]=H[n]w[n]$, in which w[n] is an SLNR pre-coding vector at time slot n and H[n] is the real channel at time slot n.

3. The method of claim 1:
   wherein the UE uses Minimum-Mean-Square-Error (MMSE) receiver;

wherein the combining vector, g[n], is determined as $$g[n] = \left(\sum_{j=1}^{K} H[n]w_j^H[n]H^H[n] + N_0 I_{N_R}\right)^{-1} H[n]w[n],$$

where K is the number of UEs currently receiving transmissions from the RBS at time slot n, $H^H[n]$ is the Hermitian transposition of the real channel at time slot n, H[n] is the real channel at time slot n, w[n] is an SLNR pre-coding vector at time slot n $w_j^H[n]$ is a conjugate transposition of the SLNR precoding vector at time slot n for UE j, $N_o$ is the noise power of each antenna employed by the UE, and $I_{N_R}$ is an $N_R * N_R$ identity matrix in which $N_R$ is the number of antennas employed by the UE.

4. The UE of claim 1, wherein the combining vector is determined depending on the type of receiver at the UE.

5. The method of claim 1, wherein a feedback vector (t[n]) is determined as t[n]=$H^H$[n]g[n], where $H^H$[n] is the Hermitian transposition of the real channel at time slot n and g[n] is the combining factor.

6. A method, in a radio base station (RBS), for a joint transmit and receive procedure with K numbers of user equipments (UEs), where K≥1, the method comprising:
    transmitting a first respective transmission to the K UEs at a time slot n−1, each transmission comprising an individual first pre-coded symbol;
    receiving individual feedback vectors, at time slot n, from at least a part of the UEs having determined their respective feedback vectors based on the respective first transmission;
    determining individual Signal-to-Leakage-and-Noise-Ratio (SLNR) pre-coding vectors for the UEs based on the received feedback vectors;
    pre-coding, for respective UEs, a second individual symbol using the respective individual determined SLNR pre-coding vector;
    transmitting, at time slot n+1, the respective pre-coded second symbol in a second transmission to the UEs.

7. The method of claim 6, wherein the SLNR pre-coding vector for UE k at time slot n+1, $w_k[n+1]$, is determined as $$W_k[n+1] = \zeta_{max}\left[\left(N_R N_0 I_{N_T} + \tilde{t}_k[n]\tilde{t}_k^H[n]\right)^{-1} t_k[n]t_k^H[n]\right],$$

where $\zeta_{max}[-]$ denotes a mathematical operation which returns the eigenvector corresponding to the largest eigenvalue of a matrix, $N_o$ is the noise power of each antenna employed by the UE, and $I_{N_T}$ is an $N_T * N_T$ identity matrix in which $N_T$ is the number of antennas at the RBS, $t_k[n]$ is the feedback vector at time slot n for UE k, $t_k^H[n]$ is the conjugate transposition of the feedback vector, $\tilde{t}_k t_{[n]=[t1}[n], \ldots, t_{k-1}[n], t_{k+1}[n], \ldots, t_K[n]]$ is a matrix consisting of feedback vectors at time slot n for all UEs being served by the RBS except UE k, and, $\tilde{t}_k t^H_k[n]$ is the Hermitian transposition of the matrix $\tilde{t}_k t_{k[n]}$.

8. The method of claim 6, further comprising determining a beam forming vector for time slot n+1 as $$\tilde{w}_k[n+1] = \zeta_{max}\left[\left(N_R N_0 I_{N_T} + \tilde{F}_k[n]\right)^{-1} F_k[n]\right],$$

where $N_R$ is the number of antennas employed by UE k, $N_o$ is the noise power of each antenna employed by UE k, $I_{N_T}$ is an $N_T * N_T$ identity matrix in which $N_T$ is the number of antennas at the RBS, $$\tilde{F}_k[n] = \sum_{j=1, j \neq k}^{K} F_j[n],$$

in which $F_j[n]$ represents a modified version of a correlation of the feedback vector employed by UE j and $F_k[n]$ represents a modified information of interference correlation which is the summation of $F_j[n]$ with j≠k.

9. A user equipment (UE) adapted for a joint transmit and receive procedure with a radio base station (RBS), the UE comprising:
    one or more processing circuits configured to function as:
        a receiving circuit configured to receive a first transmission from the RBS at a time slot n, the transmission comprising a first pre-coded symbol;
        an estimating circuit configured to estimate a real channel for a channel over which the first transmission is received and an effective channel, the real channel referring to a transfer function estimated by the UE by means of reference signals, the effective channel referring to the real channel adjusted by transmission weights for the received first transmission;
        a determining circuit configured to determine a combining vector based on the effective channel, and to determine a feedback vector based on the combining vector and the real channel;
        a transmitting circuit configured to transmit the feedback vector to the RBS, to be used by the RBS for determining a Signal-to-Leakage-and-Noise-Ratio (SLNR) pre-coding vector for a second transmission to the UE in a subsequent time slot.

10. The user equipment of claim 9:
    wherein the UE is configured to use a Matched Filter (MF) receiver;
    wherein the combining vector, g[n], is determined as g[n]=H[n]w[n], in which w[n] is an SLNR pre-coding vector at time slot n and H[n] is the real channel at time slot n.

11. The user equipment of claim 9:
    wherein the UE is configured to use Minimum-Mean-Square-Error (MMSE) receiver;
    wherein the combining vector, g[n], is determined as $$g[n] = \left(\sum_{j=1}^{K} H[n]w_j^H[n]H^H[n] + N_0 I_{N_R}\right)^{-1} H[n]w[n],$$

where K is the number of UEs currently receiving transmissions from the RBS at time slot n, $H^H[n]$ is the Hermitian transposition of the real channel at time slot n, H[n] is the real channel at time slot n, w[n] is an SLNR pre-coding vector at time slot n $w_j^H[n]$ is a conjugate transposition of the SLNR precoding vector at time slot n for UE j, $N_o$ is the noise power of each antenna employed by the UE, and $I_{N_R}$ is an $N_R*N_R$ identity matrix in which $N_R$ is the number of antennas employed by the UE.

12. The user equipment of claim 9, wherein the determining circuit further is configured to determine the feedback vector, t[n], as $t[n]=H^H[n]g[n]$, where $H^H[n]$ is the Hermitian transposition of the real channel at time slot n and g[n] is the combining factor.

13. A radio base station (RBS) adapted for a joint transmit and receive procedure with K numbers of user equipments (UEs), where K≥1, the RBS comprising:
one or more processing circuits configured to function as:
a transmitting circuit configured to transmit, a first respective transmission to the K UEs at a time slot n−1, each transmission comprising an individual first pre-coded symbol;
a receiving circuit configured to receive individual feedback vectors from at least a part of the UEs having determined their respective feedback vectors based on the respective first transmission;
a determining circuit configured to determine individual Signal-to-Leakage-and-Noise-Ratio (SLNR) pre-coding vectors for the UEs based on the received feedback vectors;
a pre-coding circuit configured to pre-code, for respective UEs, a second individual symbol using the respective individual determined SLNR pre-coding vector;
wherein the transmitting circuit further is configured to transmit the respective pre-coded second symbol in a second transmission to the UEs at time slot n+1.

14. The radio base station of claim 13, wherein the determining circuit is configured to determine the SLNR pre-coding vector for UE k as $$W_k[n+1] = \zeta_{max}\left[\left(N_R N_0 I_{N_T} + \tilde{t}_k[n]\tilde{t}_k^H[n]\right)^{-1} t_k[n]t_k^H[n]\right],$$

where $\zeta_{max}[-]$ denotes a mathematical operation which returns the eigenvector corresponding to the largest eigenvalue of a matrix, $N_R$ is the number of antennas employed by the UE k, $N_o$ is the noise power of each antenna employed by the UE k, and $I_{N_T}$ is an $N_T*N_T$ identity matrix in which $N_T$ is the number of antennas at the RBS, $t_k[n]$ is the feedback vector at time slot n for the UE k, $t_k^H[n]$ is the conjugate transposition of the feedback vector, $\tilde{t}_k^H[n]=[t_1[n], \ldots, t_{k-1}[n], t_{k+1}[n], \ldots, t_K[n]]$ is a matrix consisting of feedback vectors at time slot n for all UEs being served by the RBS except UE k, and $\tilde{t}_k^H[n]$ is the Hermitian transposition of the matrix $\tilde{t}_k^H[n]$.

15. The radio base station of claim 13, wherein the determining circuit further is configured to determine a beam forming vector for time slot n+1 as $$\tilde{W}_k[n+1] = \zeta_{max}\left[\left(N_R N_0 I_{N_T} + \tilde{F}_k[n]\right)^{-1} F_k[n]\right],$$

where $N_R$ is the number of antennas employed by UE k, $N_o$ is the noise power of each antenna employed by UE k, $I_{N_T}$ is an $N_T*N_T$ identity matrix in which $N_T$ is the number of antennas at the RBS, $$\tilde{F}_k[n] = \sum_{j=1,j\neq k}^{K} F_j[n],$$

in which $F_j[n]$ represents a modified version of a correlation of the feedback vector employed by UE j and $F_k[n]$ represents a modified information of interference correlation which is the summation of $F_j[n]$ with j≠k.

16. The radio base station of claim 13, wherein the transmitting circuit is configured to transmit to each of the K UEs over a respective real channel with transfer function, $H_k[n]$, and wherein the received individual feedback vectors, $t_k[n]$, from at least a part of the UEs is a function of $H_k[n]$ and an effective channel, wherein the effective channel is the real channel adjusted by transmission weights for the transmitted respective transmission.

* * * * *

UNITED STATES PATENT AND TRADEMARK OFFICE
CERTIFICATE OF CORRECTION

PATENT NO. : 9,706,548 B2
APPLICATION NO. : 14/375481
DATED : July 11, 2017
INVENTOR(S) : Haochuan Zhang et al.

It is certified that error appears in the above-identified patent and that said Letters Patent is hereby corrected as shown below:

In Column 15, Line 5, delete the following equation:

" $g[n] = \left( \sum_{j=1}^{K} H[n] w_j^H[n] H^H[n] + N_o I_{N_R} \right)^{-1} H[n] w[n]$ ,"

And insert the following equation:

-- $g[n] = \left( \sum_{j=1}^{K} H[n] w_j[n] w_j^H[n] H^H[n] + N_O I_{N_R} \right)^{-1} H[n] w[n]$ --

In Column 16, Line 59, delete the following equation:

" $g[n] = \left( \sum_{j=1}^{K} H[n] w_j^H[n] H^H[n] + N_o I_{N_R} \right)^{-1} H[n] w[n]$ ,"

And insert the following equation:

-- $g[n] = \left( \sum_{j=1}^{K} H[n] w_j[n] w_j^H[n] H^H[n] + N_O I_{N_R} \right)^{-1} H[n] w[n]$ --

Signed and Sealed this
Twelfth Day of December, 2017

*Joseph Matal*
*Joseph Matal*
*Performing the Functions and Duties of the*
*Under Secretary of Commerce for Intellectual Property and*
*Director of the United States Patent and Trademark Office*